United States Patent
Bach et al.

(10) Patent No.: US 7,065,153 B2
(45) Date of Patent: Jun. 20, 2006

(54) HIGH SPEED MONOLITHIC MICROWAVE INTEGRATED CIRCUIT (MMIC) QUADRATURE PHASE SHIFT KEYING (QPSK) AND QUADRATURE AMPLITUDE MODULATION (QAM) MODULATORS

(75) Inventors: Susan E. Bach, Redondo Beach, CA (US); Kurt W. Loheit, Rancho Palos Verdes, CA (US); Remy O. Hiramoto, Hermosa Beach, CA (US); Daniel H. Koyama, Torrance, CA (US); Suzanne E. Kubasek, El Segundo, CA (US); Craig Schulz, Fremont, CA (US)

(73) Assignee: The Boeing Company, Chicago, IL (US)

( * ) Notice: Subject to any disclaimer, the term of this patent is extended or adjusted under 35 U.S.C. 154(b) by 803 days.

(21) Appl. No.: 10/071,954

(22) Filed: Feb. 6, 2002

(65) Prior Publication Data

US 2003/0147472 A1 Aug. 7, 2003

(51) Int. Cl.
*H04L 27/04* (2006.01)
*H04L 27/12* (2006.01)
*H04L 27/20* (2006.01)

(52) U.S. Cl. .................. 375/295; 375/298; 375/308
(58) Field of Classification Search ................ 375/295, 375/298, 308, 261
See application file for complete search history.

(56) References Cited

U.S. PATENT DOCUMENTS

| | | | |
|---|---|---|---|
| 5,499,271 A * | 3/1996 | Plenge et al. ............... | 375/295 |
| 6,049,721 A | 4/2000 | Serizawa et al. | |
| 6,163,230 A * | 12/2000 | Lapierre et al. ........... | 332/103 |
| 6,169,761 B1 | 1/2001 | Marcoccia et al. | |
| 6,236,678 B1 | 5/2001 | Horton, Jr. et al. | |
| 6,252,910 B1 | 6/2001 | West et al. | |
| 6,434,199 B1 * | 8/2002 | Desrosiers et al. ......... | 375/261 |
| 2004/0213229 A1 * | 10/2004 | Chang et al. ............... | 370/390 |

* cited by examiner

*Primary Examiner*—Kevin Burd
*Assistant Examiner*—Juan Alberto Torres
(74) *Attorney, Agent, or Firm*—Shimokaji & Associates, P.C.

(57) ABSTRACT

In a system for modulating an RF carrier, the RF carrier is fed through a lowpass filter and phase shifted approximately –90 degrees. The RF carrier is also fed through a high pass filter and phase shifted approximately +90 degrees. A switch connected to the output of the lowpass filter and connected to the output of the highpass filter, selects and outputs either the –90 degree phase shifted carrier output from the lowpass filter or the +90 degree phase shifted carrier output from the highpass filter depending on a switching state determined by data bit information received at a data port to produce a BPSK modulated RF carrier. Two such BPSK modulators may be combined using lowpass and highpass filters to form a QPSK modulator. Two such QPSK modulators may be combined with an attenuator to form a QAM modulator.

16 Claims, 6 Drawing Sheets

HIGH SPEED MONOLITHIC MICROWAVE INTEGRATED CIRCUIT (MMIC) QUADRATURE PHASE SHIFT KEYING (QPSK) AND QUADRATURE AMPLITUDE MODULATION (QAM) MODULATORS

BACKGROUND OF THE INVENTION

The present invention generally relates to high frequency, high data rate wireless telecommunication systems and, more particularly, to band efficient modulation for quadrature phase shift keying (QPSK) and quadrature amplitude modulation (QAM) using monolithic microwave integrated circuits (MMIC).

Capability of current communication systems is limited due to smaller channel bandwidth allocations, typically less than 100 MHz (mega Hertz, or million cycles per second), available in the FCC allocated frequency bands in the range of 1 to 40 giga Hertz (GHz). One way for current systems to achieve higher data rates within these bands, is to use modulation schemes which are more bandwidth efficient, but achieving more bandwidth-efficient modulation presents rigorous technical challenges and typically requires more complex and expensive hardware.

Conventional modulation systems consist of a modulator operated at an intermediate frequency (IF) and a number of filters, amplifiers and mixers that upconvert the modulated signal to the transmit frequency, also called the carrier frequency. The demand for higher speed data transmission imposes increasingly stringent requirements on the modulators in these systems, as data rates approach the maximum bandwidth capabilities of these circuits. At multi-giga bit per second (Gbps) data rates, these modulator circuits become impractical as the bandwidth required for the high, multi-Gbps, data rate becomes very wide relative to the intermediate frequency, referred to as relative bandwidth requirement, and exceeds the technology limitations of the modulator circuit.

Conventional modulation systems may address the relative bandwidth requirement by upgrading to newer and faster transistor technology, such as silicon-germanium, or SiGe, heterojunction transistor technology. The relatively extensive hardware requirement for conventional modulation systems, however, makes upgrading the hardware relatively expensive. Another approach is to use digital modulation to enhance spectrum, i.e., bandwidth, efficiency. While digital techniques are generally desirable, a drawback to the digital modulation approach is the dependency on technological development of state-of-the-art processes. This dependency becomes more critical when pushing the performance capabilities of new processes. In business applications, it may be difficult and costly to qualify new processes, especially where high reliability is a prime concern.

MMICs have become an important advancement in the communications field. MMICs are low cost, high bandwidth circuit devices that operate at microwave and millimeter wave frequencies. MMIC's are analog circuits which downconvert a modulated signal to a baseband signal or upconvert the baseband signal to a microwave signal. One way to generate a high data rate signal is to directly modulate the microwave carrier at the high data rates. This direct modulation scheme reduces physical size and cost of the communications system by eliminating much of the hardware previously needed in such systems. A major technical challenge in this type of modulation, however, is achieving low amplitude and phase error over the wide bandwidth requirement.

Direct carrier modulation may use mature microwave device technology such as GaAs, and may also apply digital modulation techniques such as QPSK. An example of QPSK modulation is illustrated by the block diagram of FIG. 1, where two-bit data word 102 and carrier 104 are input to phase modulator 100, which outputs QPSK modulated carrier 106 corresponding to a signal, S, of the form:

$$S(t)=A\cos(\omega_s t - \theta + \psi) \quad (1)$$

where A is the carrier amplitude constant and $\psi$ is the phase constant. There are four possible values for two-bit data word 102. Phase modulator 100 maps each of the four possible values for two-bit data word 102 to a distinct value of the phase angle $\theta$.

The QPSK modulated carrier 106 output from phase modulator 100 may be represented on a phase diagram such as phase diagram 200 seen in FIG. 2. Phase diagram 200 shows that phase angle $\theta$ will take on the form of one of four phases separated by 90 degrees. As shown in FIG. 2, each of the four possible values of two-bit data word 102 is represented by a symbol 202, which is a point, or vector, $s_1$, $s_2$, $s_3$ or $s_4$, in the phase plane of phase diagram 200. Two bits of information, or one symbol, is sent every word time corresponding to one of the four vectors, or symbols, in phase diagram 200.

The symbols of QPSK signals may also be conceptualized as two pairs of a bi-orthogonal set. FIG. 3 shows a common implementation, using that concept, of QPSK modulator 300 employing orthogonal bi-phase shift keying (BPSK) modulators 310 and 320. The circuit of QPSK modulator 300 shown in FIG. 3 uses double-balanced mixers for BPSK modulators 310 and 320. As seen in FIG. 3, two-bit data word 302 is extracted from bit sequences 303 and 305. Bit sequence 303 and carrier 314 are input to BPSK modulator 310, which outputs BPSK modulated signal 316. Bit sequence 305 and carrier 324 are input to BPSK modulator 320, which outputs BPSK modulated signal 326. BPSK modulated signals 316 and 326 are added by summer 330 and output as QPSK modulated carrier 336 corresponding to a signal, S, of the form:

$$S(t)=A\cos(\omega_s t - \theta + \psi) \quad (2)$$

where A is the carrier amplitude constant and $\psi$ is the phase constant. There are four possible values for two-bit data word 302 each of which is mapped to a distinct value of the phase angle $\theta$. Because carriers 314 and 324 differ in phase by 90 degrees, phase angle $\theta$ will take on one of four phase values separated by 90 degrees, as shown in FIG. 2, with each of the four possible values of two-bit data word 302 represented by a symbol 202, which is a vector, $s_1$, $s_2$, $s_3$ or $s_4$, in the phase plane of phase diagram 200.

FIG. 4 shows a basic MMIC implementation of QPSK modulator 400 using a number of 90 degree Lange couplers 402, 404, 406, and 408. Conventional MMIC implementation of QPSK modulator 400 has carrier input 410 entering QPSK modulator 400 and then split into two orthogonal components 412 and 414 by use of Lange coupler 402. Orthogonal components 412 and 414 then pass into two variable bi-phase modulators 404 and 406, which each include another Lange coupler. Bi-phase modulators 404 and 406 split the signal again before the signal goes into variable reflection loads 416, 418, 420, and 422. These complex circuits have been popular as analog modulators, or as vector modulators, where both amplitude and phase are varied. Normally, 90 degree hybrids or Lange couplers are used. The added complexity of these circuit designs and the technical difficulties they present in achieving the low amplitude and phase error over the wide bandwidth requirement needed for high data rate operation, however, has largely limited them to Mbps data rates, where the relative bandwidth requirement is reduced because the bandwidth required for the lower, Mbps, data rate is narrow enough relative to the higher intermediate or carrier frequency.

FIG. 5 shows how two QPSK modulation systems 510 and 520 may be combined in a QAM modulation system 500 to achieve a 16 QAM signal 536. An RF or IF carrier is provided by local oscillator 504 using timing reference 501, as known in the art. The RF or IF carrier is split into carriers 514 and 524, and each is fed into QPSK modulation systems 510 and 520, respectively. Two-bit data word 512, which includes bits $b_0$ and $b_1$ as shown in FIG. 5, and carrier 514 are input to QPSK modulation system 510. QPSK modulation system 510 outputs QPSK modulated carrier 516 corresponding to a signal which may be represented, as described above in connection with FIG. 2, by vectors 616 on phase diagram 610 shown in FIG. 6. Similarly, two-bit data word 522, which includes bits $b_2$ and $b_3$ as shown in FIG. 5, and carrier 524 are input to QPSK modulation system 520. QPSK modulation system 520 outputs a QPSK modulated carrier 526, which travels through attenuator 527. Attenuator 527 lowers the amplitude of QPSK modulated carrier 526. The attenuated QPSK modulated carrier 526 corresponds to a signal which may be represented, as described above in connection with FIG. 2, by vectors 626 on phase diagram 620 shown in FIG. 6.

As seen in FIG. 5, the two QPSK modulated carriers 516 and 526 are added by summer 530 and output as QAM modulated carrier 536 corresponding to a signal which may be represented, as described above in connection with FIG. 2, by vectors 636 on phase diagram 630 shown in FIG. 6. The addition of QPSK modulated carriers 516 and 526 is indicated in FIG. 6 by plus sign 632 and equal sign 634 representing addition of phase diagrams 610 and 620 corresponding to QPSK modulated carriers 516 and 526, respectively. Because each vector 616 and 626 represents a signal, addition of the phase diagrams is accomplished by adding each possible pair of vectors 616 and 626 to produce a vector or symbol 636 in phase diagram 630. The configuration formed by symbols 636 is referred to as a 16 QAM constellation. The vectors 616 are also shown in phase diagram 630 to provide a size orientation for the purposes of illustration only, but do not form part of the 16 QAM constellation illustrated in phase diagram 630. Each symbol 636 represents a pair of two-bit data words 512 and 522, which may be viewed as a four-bit data word, $b_0, b_1, b_2, b_3$. Each four-bit data word has 16 possible values each of which is mapped by QAM modulation system 500 to one distinct symbol 636 of the 16 symbols 636.

Physical limitations and variances in the circuits used to implement QAM modulation system 500 cause variance, or inexactitude, in the amplitudes and phases of symbols 636 during transmission of the QAM modulated signal. The variances may cause some of the symbols 636 to occasionally be transmitted closer together in phase diagram 630. If the variances, or imperfections, are too great, the receiver may not be able to reliably provide resolution of the symbols to permit faithful demodulation of the QAM modulated signal at the receiver. Imperfections that limit the effectiveness of QAM modulation systems, may be reduced by achieving low amplitude and phase error over the channel bandwidth. The technical difficulties in achieving low amplitude and phase error over the channel bandwidth have restricted the use of QAM modulation systems to lower frequencies and narrower bandwidths than is desirable.

As can be seen, there is a need for direct modulation in communication systems that reduces the relative bandwidth requirement, thus allowing higher data rates relative to the carrier frequency. Moreover, there is a need for modulation in communication systems that use MMIC to improve amplitude and phase balance, and achieve operation at higher frequencies where wider channel bandwidth allocations are potentially available.

SUMMARY OF THE INVENTION

The present invention provides direct modulation in wireless telecommunication systems that reduces the relative bandwidth requirement, thus allowing higher data rates relative to the carrier frequency. Moreover, the present invention provides modulation in wireless telecommunication systems that use MMIC to improve amplitude and phase balance to achieve operation at higher frequencies where wider channel bandwidth allocations are potentially available.

In one aspect of the present invention, in a system for modulating an RF carrier, the RF carrier is fed through a lowpass filter and phase shifted approximately −90 degrees. The RF carrier is also fed through a high pass filter and phase shifted approximately +90 degrees. A switch connected to the output of the lowpass filter and connected to the output of the highpass filter, selects and outputs either the −90 degree phase shifted carrier output from the lowpass filter or the +90 degree phase shifted carrier output from the highpass filter depending on a switching state determined by data bit information received at a data port to produce a BPSK modulated RF carrier.

In another aspect of the present invention, in a system for modulating an RF carrier, the RF carrier is fed through a lowpass filter and phase shifted approximately −45 degrees. The RF carrier is also fed through a high pass filter and phase shifted approximately +45 degrees. A BPSK modulator using lowpass and highpass filters to phase shift the RF carrier approximately +90 or −90 degrees and a switch to select the output determined by data bit information received at a data port, as described above, is connected to the output of the lowpass filter. Another BPSK modulator, of substantially identical configuration, using lowpass and highpass filters to phase shift the RF carrier approximately +90 or −90 degrees and a switch to select the output determined by data bit information received at a data port, as described above, is connected to the output of the highpass filter. A power divider connected to the output of the first BPSK modulator and connected to the output of the second BPSK modulator is configured to produce as output a QPSK modulated RF carrier, which is the vector sum of the output of the first BPSK modulator and the output of the second BPSK modulator.

In still another aspect of the present invention, in a system for modulating an RF carrier, the RF carrier is fed through two substantially identicallly configured QPSK modulators using lowpass and highpass filters, switches, and power dividers to phase shift the RF carrier approximately +45, −45, +135 or −135 degrees, as described above. An attenuator has its input connected to the output of the second QPSK modulator. A vector summer is connected to the output of the first QPSK modulator and is also connected to the output of the attenuator. The vector summer is configured to produce as output a QAM modulated RF carrier, which is the vector sum of the output of the first QPSK modulator and the attenuated output of the second QPSK modulator from the attenuator.

In a further aspect of the present invention, a method for modulating an RF carrier includes steps of passing the RF carrier through a lowpass filter, to produce a first phase shifted carrier output; and also passing the RF carrier through a highpass filter to produce a second phase shifted carrier output; providing data bit information to a data port; and employing a switch connected to the output of the lowpass filter and connected to the output of the highpass filter to select and output either the first phase shifted carrier output from the lowpass filter or the second phase shifted carrier output from the highpass filter depending on a switching state determined by the data bit information provided to the data port.

These and other features, aspects and advantages of the present invention will become better understood with reference to the following drawings, description and claims.

DETAILED DESCRIPTION OF THE INVENTION

Figure 2:
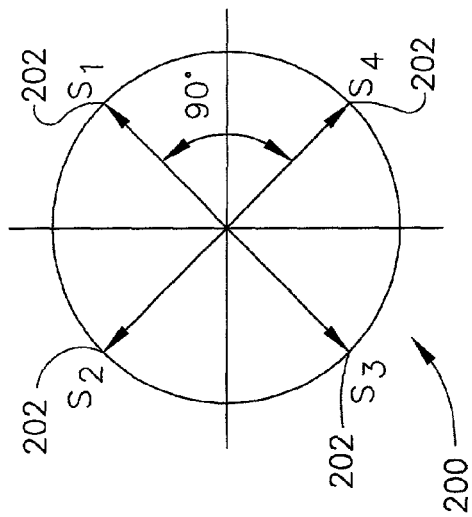
FIG. 2 is a phase diagram for a typical implementation of QPSK modulation.
Figure 1:
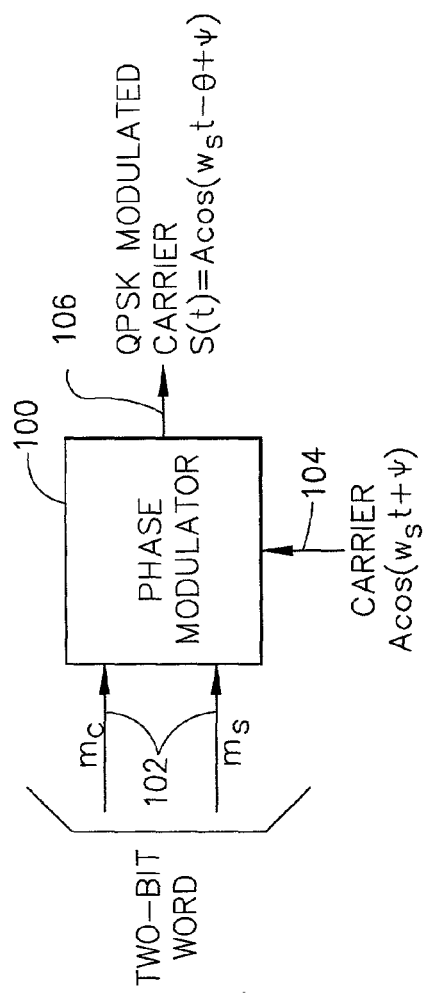
FIG. 1 is a block diagram for a typical implementation of quadrature phase shift keying (QPSK) modulation.
Figure 3:
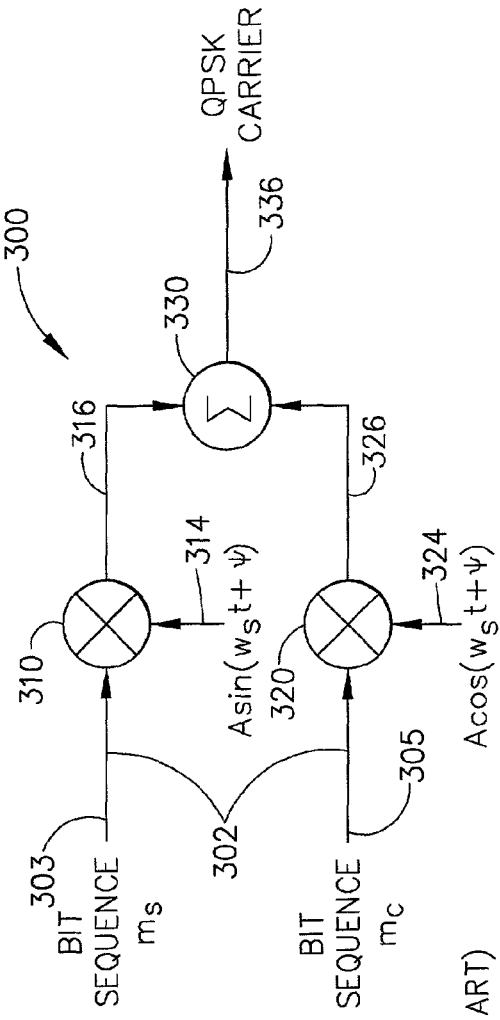
FIG. 3 is a block diagram for QPSK modulation as typically implemented using bi-phase shift keying (BPSK)
Figure 4:
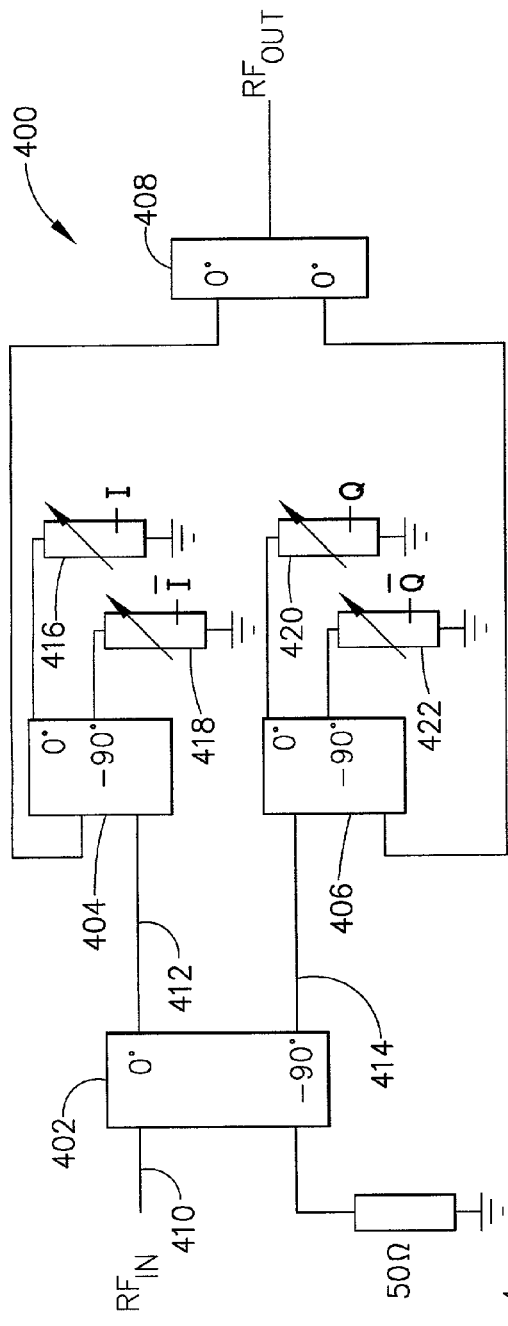
FIG. 4 is a block diagram for QPSK modulation as typically implemented using monolithic microwave integrated circuits (MMIC)
Figure 5:
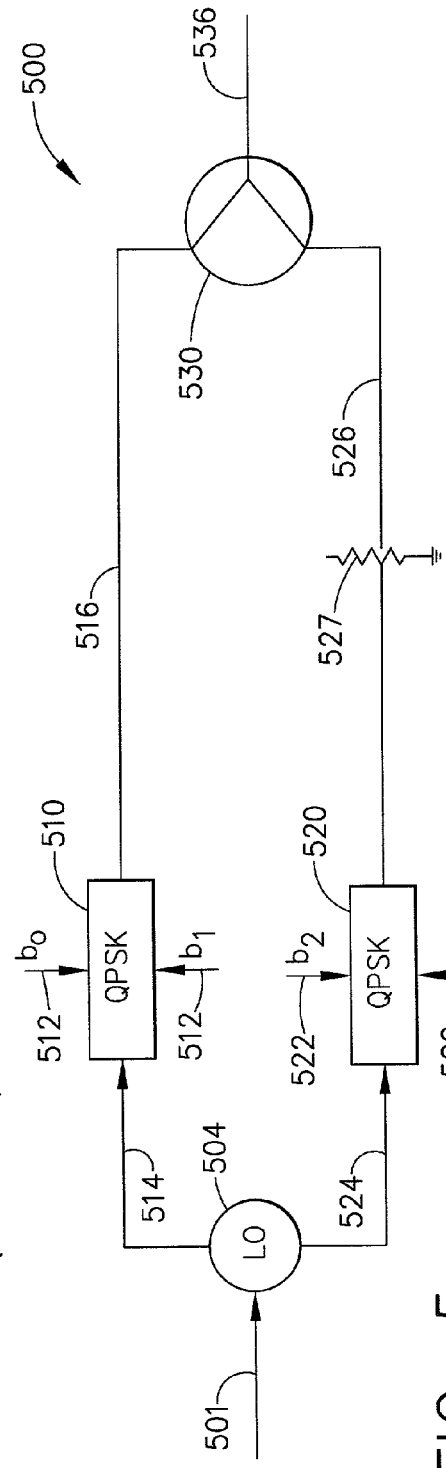
FIG. 5 is a block diagram of quadrature amplitude modulation (QAM) as typically implemented using QPSK.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides direct modulation in wireless telecommunication systems that reduce the relative bandwidth requirement, thus allowing higher data rates relative to the carrier frequency. The present invention may use monolithic microwave integrated circuits (MMIC) or application specific integrated circuits (ASIC) to directly modulate a microwave carrier at high data rates in a quadrature phase shift keying (QPSK) format or a quadrature amplitude modulation (QAM) format. The method of direct modulation in an embodiment of the present invention increases data rate and provides a better bandwidth efficient modulation scheme for transmission and receiving of data, rendering an economic advantage where spectrum allocations are limited. In one embodiment, the present invention reduces required hardware and reduces operating costs.

The present invention also provides modulation in wireless telecommunication systems that achieve low amplitude and phase error—or imbalance—over a wide bandwidth, thus lowering inter-symbol interference. In one embodiment, a modulation system exhibits an amplitude and phase imbalance of less than plus or minus 0.3 dB and 2 degrees respectively over a 6 GHz bandwidth. In one embodiment, a modulation system is capable of delivering approximately 6 Gbps of data using an analog 16 QAM modulation scheme. Unlike prior art QAM systems, which are unable to achieve comparable levels of performance, the analog 16 QAM modulation scheme may be implemented as a direct result of the benefits of a QPSK MMIC implemented to operate at high switching speeds with improved vector, i.e., amplitude and phase, performance.

Moreover, the present invention provides modulation in wireless telecommunication systems that use MMIC to improve amplitude and phase balance and achieve operation at higher frequencies where wider channel bandwidth allocations are potentially available. In one embodiment, an approach is taken to implementing QPSK modulation in MMIC that differs from standard QPSK modulation found in the prior art. The approach, in one embodiment, puts a filter network into place to significantly improve over the prior art on the amplitude and phase balance. The MMIC technology integrated into a QPSK modulation scheme differs from prior art by using a filter network to achieve higher switching speed—which translates into higher data rates—and improved amplitude and phase balance.

Direct carrier modulators have been constructed in hybrid MIC technology, but at low data rates. High data rate modulation necessitates an MMIC approach, where device and component matching, and circuit symmetry are more tightly controlled. This is important in maintaining the required amplitude and phase balance over wide bandwidths.

In one embodiment, a k-band QPSK MMIC modulation system has been fabricated in a 0.25 micrometer gallium arsenide (GaAs) pseudomorphic high electron mobility transistor (PHEMT) process, and has been developed and tested up to data rates of approximately 6 Gbps. The MMIC has been incorporated into multi-Gbps modulation systems demonstrating excellent bit error rate (BER) performance. Direct digital modulation of a microwave carrier in a GaAs MMIC reduces the hardware complexity and size of traditional modulation systems (modulator, filters, upconverter). The high degree of device and component repeatability and circuit symmetry that is achieved in a GaAs MMIC yields low amplitude and phase imbalance over a wide—greater than 6 GHz—bandwidth, thus enabling low-distortion (low BER), high data rate modulation capability.

The present invention differs from the prior art in the use of filters integrated into a general MMIC design. The present invention also differs from the prior art in the specific placement of these filters to give the correct vector sum. The present invention further differs from the prior art in the implementation using highpass filters and lowpass filters to separate two signals in an MMIC by 90 degrees. The present invention also differs from the prior art by then sending each signal through identical BPSK modulators with lowpass and highpass filters.

Figure 7:
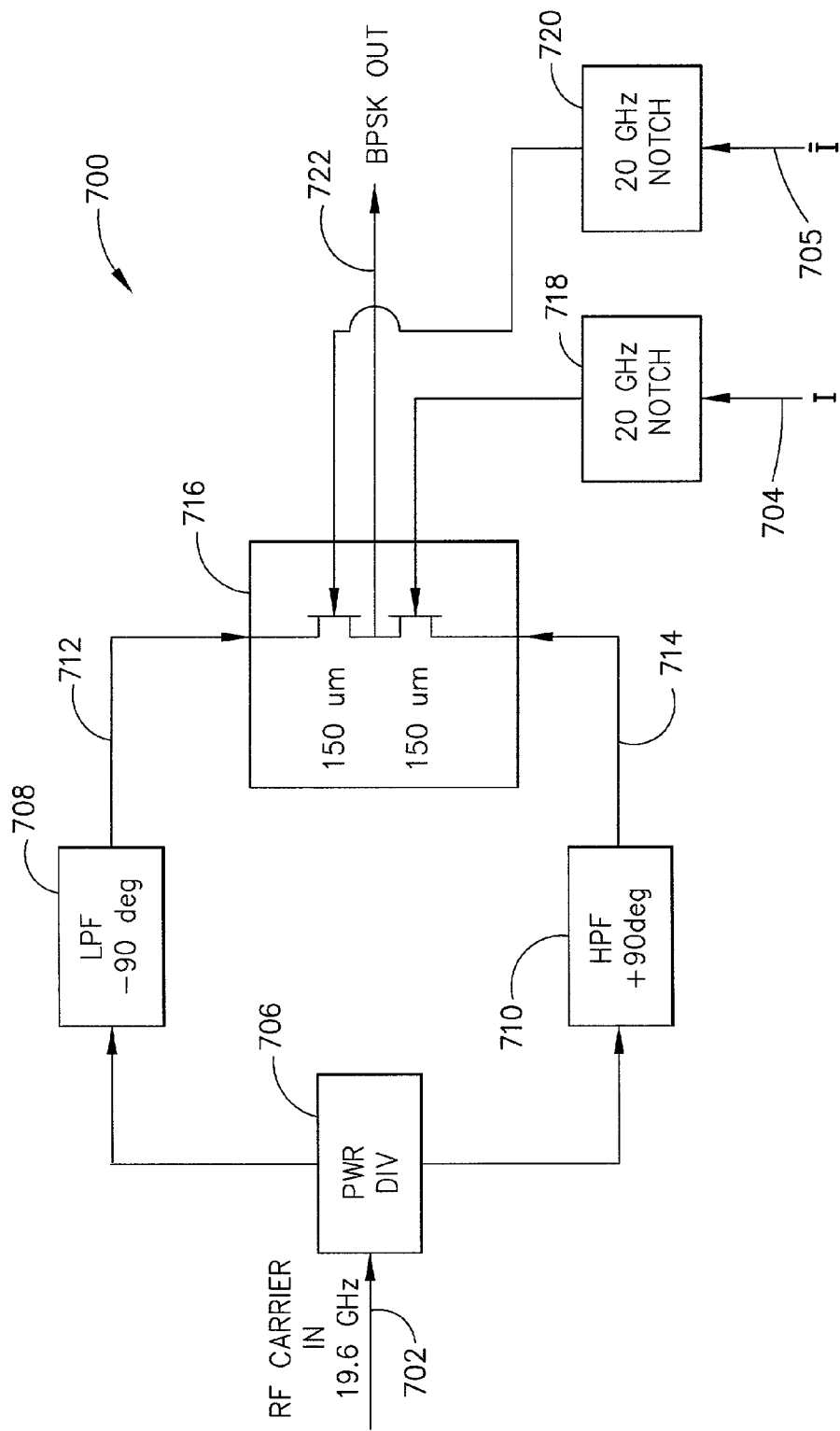
FIG. 7 is a block diagram of a filter network implementation of BPSK in MMIC, according to an embodiment of the present invention.

Referring now to FIG. 7, bi-phase shift keying (BPSK) modulator 700 is illustrated according to one embodiment.

BPSK modulator 700 may be implemented in MMIC using a series of filter networks to accomplish the desired phase shifts and to achieve the high frequency operation, amplitude and phase balance of BPSK modulator 700. The function of BPSK modulator 700 is to phase shift a carrier 702, depending on data bit information at data ports 704 and 705, to one of two vector states, as generally described above. The vector representation may be illustrated using a phase diagram similar to phase diagram 200 shown in FIG. 2.

Continuing with FIG. 7, carrier 702, which may be an RF carrier at a frequency of approximately 19.6 GHz, is input to power divider 706 of BPSK modulator 700. Power divider 706 splits carrier 702 into two equal amplitude signals and feeds carrier 702 into lowpass filter 708 and highpass filter 710. Lowpass filter 708 and highpass filter 710 may be implemented in MMIC as similar filters to achieve the precision phase and amplitude balance of BPSK modulator 700. As seen in FIG. 7, lowpass filter 708 introduces a phase shift of −90 degrees into carrier 702 and highpass filter 710 introduces a phase shift of +90 degrees into carrier 702. The −90 degree phase shifted carrier 712 or the +90 degree phase shifted carrier 714 is selected by switch 716 depending on the switching states determined by the data bit information at the I and I-bar data ports 704 and 705. The data bit information at the I and I-bar data ports 704 and 705 may be fed through identical 20 GHz notch filters 718 and 720 to switch 716, as shown in FIG. 7. The notch filters are centered about the frequency of carrier 702, i.e. approximately 19.6 GHz, to prevent direct interference between the data input sequences and carrier 702. Switch 716 outputs bi-phased signal 722 at −90 or +90 degrees, which is the BPSK output of BPSK modulator 700, as seen in FIG. 7.

Figure 8:
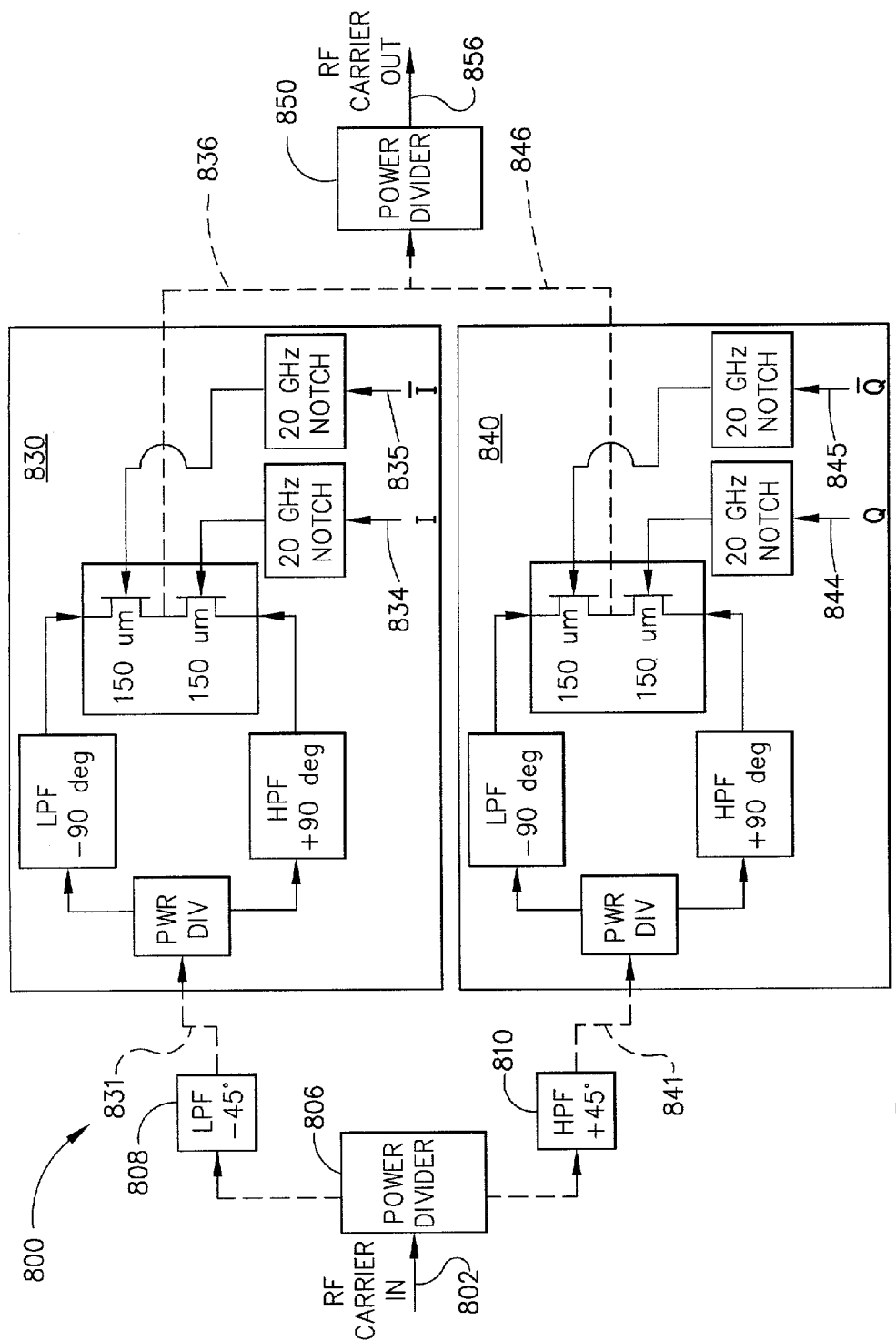
FIG. 8 is a block diagram of a filter network implementation of QPSK modulation implemented using BPSK, according to an embodiment of the present invention.

Referring now to FIG. 8, QPSK modulator 800 illustrates an example of combining two BPSK modulators 830 and 840, as described above in relation to FIG. 7, to provide QPSK modulation in accordance with one embodiment. QPSK modulator 800 may be implemented in MMIC using a series of filter networks to accomplish the desired phase shifts and to achieve the high frequency operation, amplitude and phase balance of QPSK modulator 800. The function of QPSK modulator 800 is to phase shift a carrier 802, depending on data bit information at data ports 834, 835, 844, and 845, to one of four orthogonal vector states, as generally described above. The vector representation may be illustrated using a phase diagram similar to phase diagram 200 shown in FIG. 2.

Continuing with FIG. 8, carrier 802, which may be an RF carrier at a frequency of 19.6 GHz, is input to power divider 806 of QPSK modulator 800. Power divider 806 splits carrier 802 into two equal amplitude signals and feeds carrier 802 into lowpass filter 808 and highpass filter 810. Lowpass filter 808 and highpass filter 810 may be implemented in MMIC as similar filters to achieve the precision phase and amplitude balance of QPSK modulator 800. As seen in FIG. 8, lowpass filter 808 introduces a phase shift of −45 degrees into carrier 802 and highpass filter 810 introduces a phase shift of +45 degrees into carrier 802 resulting in two signals 831 and 841 spaced 90 degrees apart (in quadrature). Each signal 831 and 841 then passes through identical BPSK modulators 830 and 840, which may be identically configured on an MMIC or ASIC chip to achieve the precision phase and amplitude balance of QPSK modulator 800. BPSK modulators 830 and 840, through similar lowpass and highpass filters, as described above in connection with FIG. 7, phase shift the signals either −90 or +90 degrees depending on the switching states. The switching states are determined by the data bit information at the I and I-bar data ports 834, 835 and the Q and Q-bar data ports 844 and 845. The data bit information at the I, I-bar, Q, and Q-bar data ports 834, 835, 844, and 845 may be fed through identical notch filters, centered about the frequency of carrier 802, approximately 20 GHz in the examples used to illustrate the embodiments described here, and as described above in relation to FIG. 7, to prevent direct interference between the I and Q data input sequences at data ports 834, 835, 844, and 845 and carrier 802.

BPSK modulators 830 and 840 output two bi-phased signals 836 and 846 in quadrature, signal 846 at 45 or +135 degrees, and signal 836 at −135 or +45 degrees relative phase. Signals 836 and 846 may be fed to power divider 850. The vector sum 856 of the two signals 836 and 846 produced by power divider 850 is the final QPSK output of QPSK modulator 800.

Figure 9:
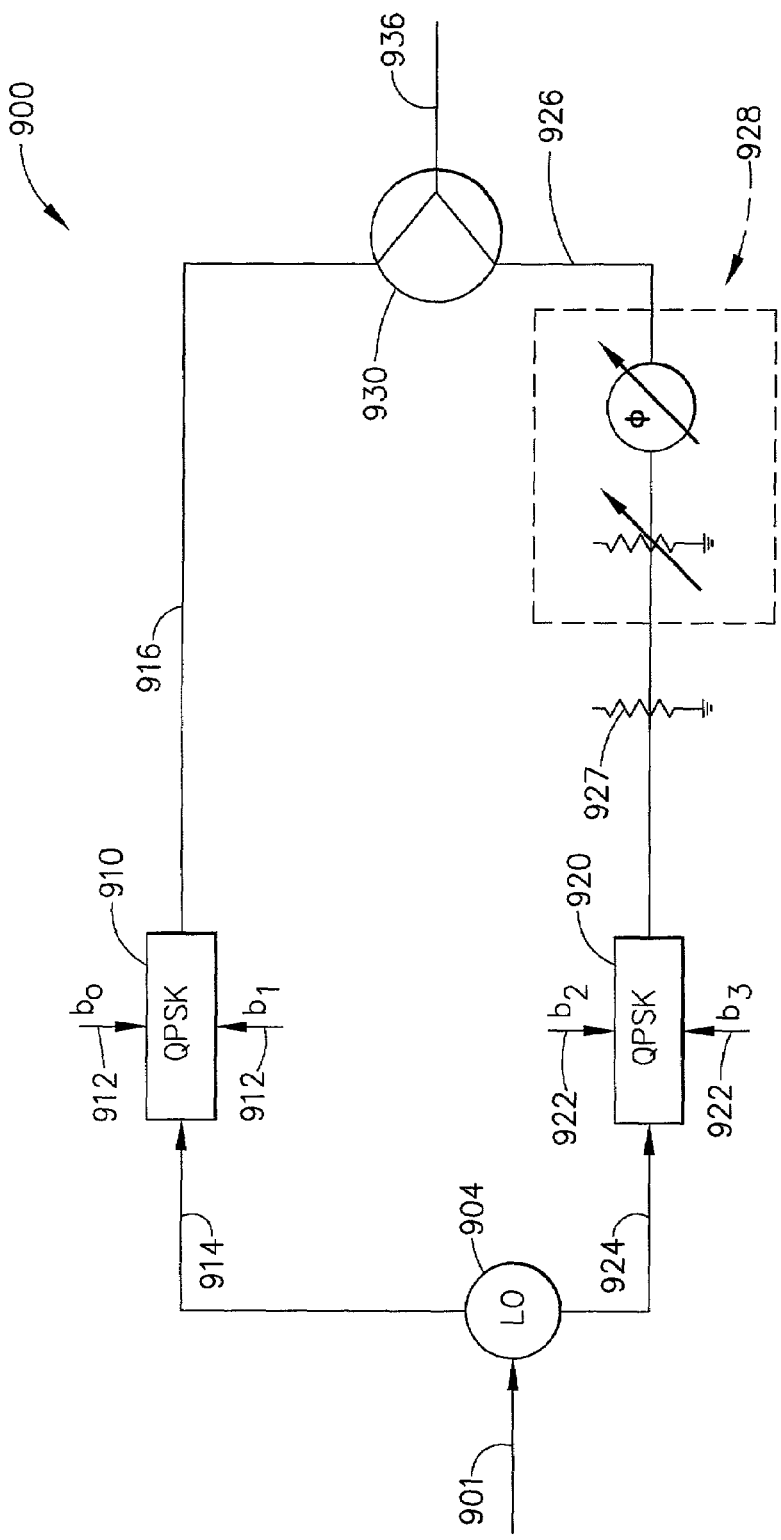
FIG. 9 is a block diagram of QAM implemented using QPSK, according to an embodiment of the present invention.

FIG. 9 shows how two QPSK modulation systems 910 and 920, as described above in connection with FIG. 8, may be combined in a QAM modulation system 900 to achieve a 16 QAM signal 936 according to one embodiment. QAM modulation system 900 may integrate QPSK MMIC filter networks, according to an embodiment as described above, to achieve amplitude and phase balance. An RF or IF carrier, which may be an RF carrier at a frequency of 19.6 GHz, for example, is provided by local oscillator 904 using timing reference 901, as known in the art. The RF or IF carrier is split into carriers 914 and 924, and each is fed into QPSK modulation systems 910 and 920, respectively, both of which may be implemented on a single MMIC or ASIC using filter networks to achieve amplitude and phase balance in accordance with an embodiment, as described above and as seen in FIG. 8. Two-bit data word 912, which includes bits $b_0$ and $b_1$ as shown in FIG. 9, and carrier 914 are input to QPSK modulation system 910. Bits $b_0$ and $b_1$, for example, may correspond to the I and Q data input sequences at data ports 834, 835, 844, and 845 of a first QPSK modulator 800 as described above. QPSK modulation system 910 outputs QPSK modulated carrier 916 corresponding to a signal which may be represented by vectors 616 on phase diagram 610 shown in FIG. 6.

Similarly, two-bit data word 922, which includes bits $b_2$ and $b_3$ as shown in FIG. 9, and carrier 924 are input to QPSK modulation system 920. Bits $b_2$ and $b_3$, for example, may correspond to the I and Q data input sequences at data ports 834, 835, 844, and 845 of a second QPSK modulator 800 as described above. QPSK modulation system 920 outputs a QPSK modulated carrier 926, which travels through attenuator 927. Attenuator 927 lowers the amplitude of QPSK modulated carrier 926. QAM modulation system 900 may further include an automatic gain and phase control 928 to compensate for the many distortions that occur throughout the system. Automatic gain and phase control 928 varies the attenuator value based on how the distortions affect the output signal, QPSK modulated carrier 926. The attenuated QPSK modulated carrier 926 corresponds to a signal which may be represented by vectors 626 on phase diagram 620 shown in FIG. 6.

Figure 6:
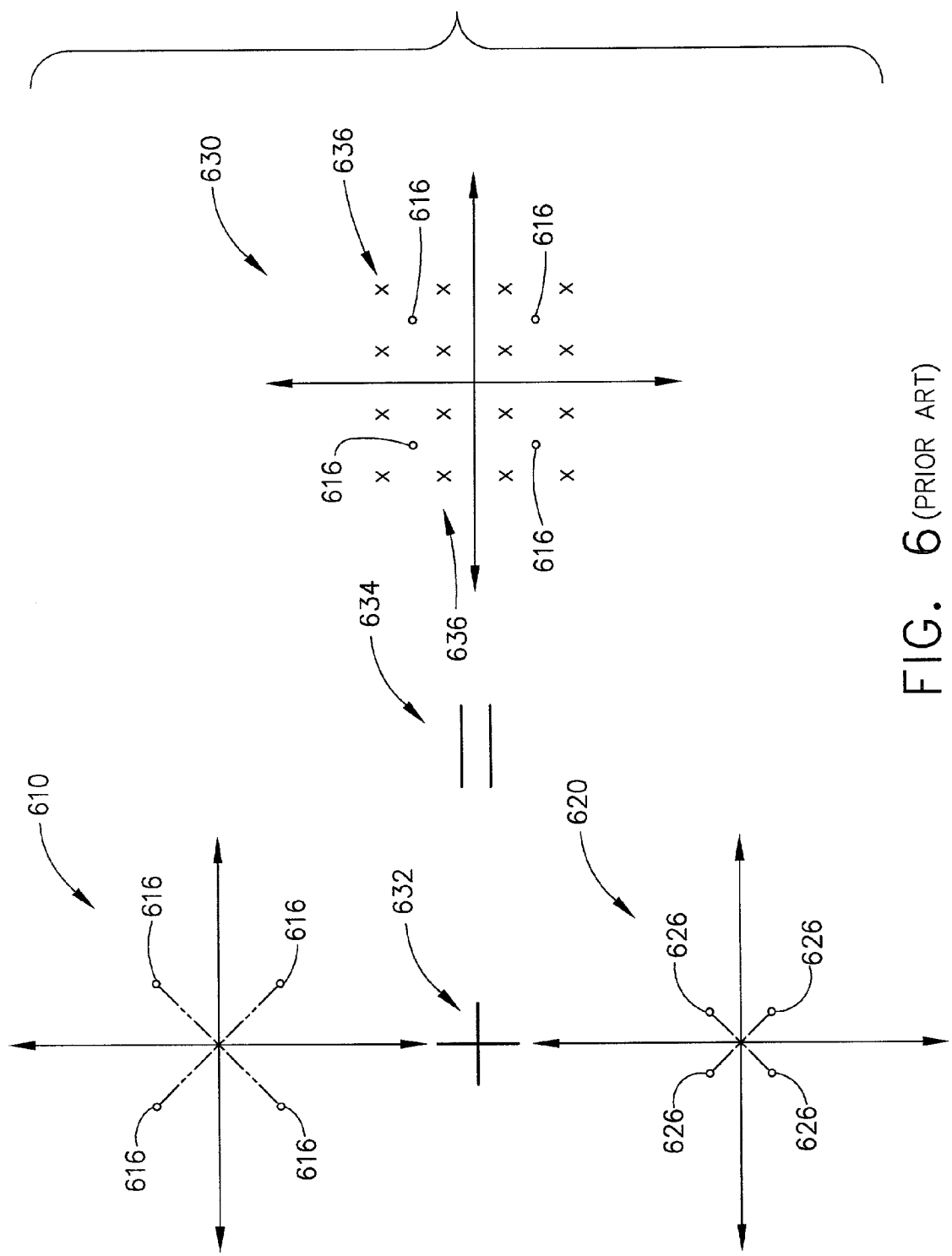
FIG. 6 is a group of phase diagrams illustrating the implementation of QAM as typically implemented using QPSK.

As seen in FIG. 9, the two QPSK modulated carriers 916 and 926 are added by summer 930 and output as QAM modulated carrier 936 corresponding to a signal which may be represented by vectors 636 on phase diagram 630 shown in FIG. 6. The vectors 616 are also shown in phase diagram 630 to provide a size orientation for the purposes of illustration only, but do not form part of the 16 QAM constellation illustrated in phase diagram 630. Each symbol 636 represents a pair of two-bit data words 912 and 922, which may be viewed as a four-bit data word, b0, b1, b2, b3. Each four-bit data word has 16 possible values, each of which is mapped by QAM modulation system 900 to one distinct symbol 636 of the 16 symbols 636.

Because of the superior amplitude and phase balance, i.e., reduced amplitude and phase error, achieved by the implementation of QAM modulation system 900 in MMIC using filter networks according to an embodiment, inter-symbol interference is sufficiently reduced for QAM modulation system 900 to achieve the desirable high frequency and wide bandwidth communications described above.

It should be understood, of course, that the foregoing relates to preferred embodiments of the invention and that modifications may be made without departing from the spirit and scope of the invention as set forth in the following claims.

We claim:

1. A system for modulating an RF carrier comprising:
at least one pair of balanced modulators, wherein said modulators are identically configured with respect to control of device and component matching and circuit symmetry on a monolithic microwave integrated circuit (MMIC), each modulator including:
 a lowpass filter with input connected to the RF carrier, said lowpass filter producing a first phase shifted carrier output;
 a highpass filter with input connected to the RE carrier, said highpass filter producing a second phase shifted carrier output;
 a data port for receiving data bit information;
 a symmetrical pair of notch filters, each centered at the frequency of the RF carrier, wherein a first of said symmetrical pair of notch filters feeds said data bit information exclusive of said RF carrier to said data port; and a second of said symmetrical pair of notch filters feeds a complement of said data bit information exclusive of said RF carrier to said data port and
 a switch connected to an output of said lowpass filter and connected to an output of said highpass filter, said switch configured to select and output either said first phase shifted carrier output from said lowpass filter or said second phase shifted carrier output from said highpass filter depending on a switching state, said switching state determined by said data bit information at said data port.

2. The system of claim 1 wherein said lowpass filter phase shifts the RF carrier approximately −90 degrees to produce said first phase shifted carrier output.

3. The system of claim 1 wherein said highpass filter phase shifts the RF carrier approximately +90 degrees to produce said second phase shifted carrier output.

4. The system of claim 1 further comprising a power divider configured to split the RF carrier into two equal amplitude signals and feed the RF carrier into said lowpass filter and into said highpass filter.

5. The system of claim 1 wherein said system is fabricated using MMIC.

6. The system of claim 1 wherein said system is fabricated using ASIC.

7. A system for modulating an RF carrier comprising:
 a lowpass filter with input connected to the RF carrier, said lowpass filter producing a phase shifted carrier output;
 a highpass filter with input connected to the RF carrier, said highpass filter producing a phase shifted carrier output;
 a first BPSK modulator with first input connected to said lowpass filter, said first BPSK modulator comprising:
  a first lowpass filter with input connected to said first input, said first lowpass filter producing a first phase shifted carrier output;
  a first highpass filter with input connected to said first input, said first highpass filter producing a second phase shifted carrier output;
  a first symmetrical pair of notch filters centered about the RF carrier frequency and that receives a first data bit information;
  a first data port for receiving said first data bit information through said first symmetrical pair of notch filters; and
  a first switch connected to an output of said first lowpass filter and connected to an output of said first highpass filter, and connected to said first symmetrical pair of notch filters via said first data port, said first switch configured to select and output either said first phase shifted carrier output or said second phase shifted carrier output depending on a first switching state, said first switching state determined by said first data bit information at said first data port;
 a second BPSK modulator, identical in configuration to said first BPSK modulator, being identically configured with respect to circuit symmetry and device and component matching on a monolithic microwave integrated circuit (MMIC), with second input connected to said highpass filter, said second BPSK modulator comprising
  a second lowpass filter with input connected to said second input, said second lowpass filter producing a third phase shifted carrier output;
  a second highpass filter with input connected to said second input, said second highpass filter producing a fourth phase shifted carrier output;
  a second symmetrical pair of notch filters centered about the RF carrier frequency and that receives a second data bit information;
  a second data port for receiving said second data bit information through said second symmetrical pair of notch filters; and
  a second switch connected to an output of said second lowpass filter and connected to an output of said second highpass filter, and connected to second symmetrical pair of notch filters via said second data port, said second switch configured to select and output either said third phase shifted carrier output or said fourth phase shifted carrier output depending on a second switching state, said second switching state determined by said second data bit information at said second data port; and
 a power divider connected to an output of said first BPSK modulator and connected to an output of said second BPSK modulator, said power divider configured to produce a QPSK output vector sum of said output of said first BPSK modulator and said output of said second BPSK modulator.

8. The system of claim 7 wherein said lowpass filter phase shifts the RF carrier approximately −45 degrees to produce said phase shifted carrier output.

9. The system of claim 7 wherein said highpass filter phase shifts the RF carrier approximately +45 degrees to produce said phase shifted carrier output.

10. The system of claim 7 wherein said first lowpass filter and said second lowpass filter phase shift the RF carrier an additional approximately −90 degrees to produce said first phase shifted carrier output and said third phase shifted carrier output, respectively.

11. The system of claim 7 wherein said first highpass filter and said second highpass filter phase shift the RF carrier an additional approximately +90 degrees to produce said second phase shifted carrier output and said fourth phase shifted carrier output, respectively.

12. The system of claim 7 further comprising a power divider configured to split the RF carrier into two equal amplitude signals and feed the RF carrier into said lowpass filter and into said highpass filter.

13. The system of claim 7 wherein said system is fabricated using MMIC.

14. The system of claim 7 wherein said system is fabricated using ASIC.

15. A QAM modulation system for modulating an RF carrier comprising:
 a first QPSK modulator comprising:
  a lowpass filter with input connected to the RF carrier, said lowpass filter shifting the RF carrier approximately −45 degrees;
  a highpass filter with input connected to the RF carrier, said highpass filter shifting the RF carrier approximately +45 degrees;
  a first BPSK modulator with first input connected to said lowpass filter, said first BPSK modulator comprising a first lowpass filter with input connected to said first input, said first lowpass filter producing a first phase shifted carrier output shifted approximately −135 degrees; a first highpass filter with input connected to said first input, said first highpass filter producing a second phase shifted carrier output shifted approximately +45 degrees; a first data port for receiving a first data bit information; and a first switch connected to an output of said first lowpass filter and connected to an output of said first highpass filter, said first switch configured to select and output either said first phase shifted carrier output or said second phase shifted carrier output depending on a first switching state, said first switching state determined by said first data bit information at said first data port, said first data bit information being fed to said first data port through a first pair of identical notch filters centered about the frequency of the RF carrier;
  a second BPSK modulator identical in configuration to said first BPSK modulator being identically configured with respect to circuit symmetry on a monolithic microwave integrated circuit (MMIC), with a second input connected to said high pass filter and having a second switch configured to select and output either a third phase shifted carrier output shifted approximately −45 degrees or a fourth phase shifted carrier output shifted approximately +135 degrees depending on a second switching state, said second switching state determined by a second data bit information at a second data port, said second data bit information being fed to said second data port through a second pair of identical notch filters centered about the frequency of the RF carrier;
 a second QPSK modulator; identical in configuration to said first QPSK modulator being identically configured with respect to circuit symmetry on said monolithic microwave integrated circuit (MMIC), with input connected to the RF carrier and having a third switch configured to produce a fifth phase shifted carrier output shifted approximately −135 degrees or a sixth phase shifted carrier output shifted approximately +45 degrees depending on a third switching state, said third switching state determined by a third data bit information at a third data port, said third data bit information being fed to said third data port through a third pair of identical notch filters centered about the frequency of the RF carrier; and having a fourth switch configured to produce a seventh phase shifted carrier output shifted approximately −45 degrees or an eighth phase shifted carrier output shifted approximately +135 degrees depending on a fourth switching state, said fourth switching state determined by a fourth data bit information at a fourth data port, said fourth data bit information being fed to said fourth data port through a fourth pair of identical notch filters, centered about the frequency of the RF carrier;
 an attenuator with input connected to an output of said second QPSK modulator; and
 a vector summer connected to an output of said first QPSK modulator and connected to an output of said attenuator, said vector summer configured to produce a QAM output vector sum of said output of said first QPSK modulator and said output of said attenuator.

16. A method for modulating an RF carrier comprising steps of:
 providing a first BPSK output signal including the steps of:
  passing the RF carrier through a first lowpass filter, said first lowpass filter producing a first phase shifted carrier output;
  passing the RF carrier through a first highpass filter, said first highpass filter producing a second phase shifted carrier output;
  providing first data bit information to a first data port through first identical notch filters centered about the frequency of the RF carrier, said first notch filters being identically configured with respect to circuit symmetry on a monolithic microwave integrated circuit (MMIC); and
  employing a first switch symmetrically connected to an output of said first lowpass filter and to an output of said first highpass filter to select and output either said first phase shifted carrier output from said first lowpass filter or said second phase shifted carrier output from said first highpass filter depending on a first switching state, said first switching state determined by said first data bit information provided to said first data port;
 providing a second BPSK output signal balanced to the first BPSK output including the steps of:
  passing the RF carrier through a second lowpass filter identically configured to said first lowpass filter with respect to circuit symmetry on said monolithic microwave integrated circuit (MMIC), said second lowpass filter producing a third phase shifted carrier output;
  passing the RF carrier through a second highpass filter identically configured to said first highpass filter with respect to circuit symmetry on said monolithic microwave integrated circuit (MMIC), said highpass filter producing a fourth phase shifted carrier output;
  providing second data bit information to a second data port through a second pair of identical notch filters centered about the frequency of the RF carrier, said second pair of notch filters being identically configured with respect to circuit symmetry on said monolithic microwave integrated circuit (MMIC); and employing a second switch symmetrically connected to an output of said second lowpass filter and to an output of said second highpass filter to select and output either said third phase shifted carrier output or said fourth phase shifted carrier output depending on a second switching state, said second switching state determined by said second data bit information provided to said second data port;

feeding the balanced BPSK output signals to a power divider to provide a bandwidth efficient QPSK modulated RF carrier output.

* * * * *